Patented May 14, 1946

2,400,464

UNITED STATES PATENT OFFICE 2,400,464

METHOD OF PRODUCING METHYL-BETA-CHLOROACRYLATE

Joy G. Lichty, Stow, Ohio, assignor to Wingfoot Corporation, Akron, Ohio, a corporation of Delaware No Drawing. Application October 20, 1944, Serial No. 559,664

2 Claims. (Cl. 260—486)

This invention relates to a new composition of matter and to the method of production. More particularly, the invention relates to methyl-beta-chloroacrylate as a new composition of matter.

It is well known that the methyl ester of alpha-chloroacrylic acid may be produced by means of the pyrolysis of the methyl ester of dichloropropionic acid using temperatures above 100° C. in the presence of a catalyst. This alpha-chloroacrylate may also be prepared according to the prior art by treating the corresponding dihalopropionic ester with an alkali using certain conditions of temperature and catalyst. Alkyl esters of alpha-chloroacrylic acid have also been produced by esterifying the reaction product resulting from the treatment of an aldehyde in the presence of trichloroethylene using sulfuric acid as the catalyst. The art has not solved the problem of producing the beta-chloroacrylate and particularly methyl-beta-chloroacrylate in a simple, efficient and economical manner. Applicant has discovered that he can produce the beta form of methyl-chloroacrylate starting with a dichloropropionic acid and methanol and using certain preferred conditions of temperature and contact time.

It has been discovered that it is necessary to start with a dichloropropionic acid and methanol together with proper conditions of treatment in order to produce the beta form of the methyl-chloroacrylate. Any dichloropropionic acid will work. It is preferred to use the alpha-beta-dichloropropionic acid as one of the starting materials because it is more readily available than the alpha-dichloropropionic acid and the beta-dichloropropionic acid. Mixtures of these acids are found to act under the pyrolytic conditions of this invention equally as well as any one of the acids taken alone. By a dichloropropionic acid is meant any one of the three isomers, namely, alpha, beta-dichloropropionic acid, alpha, alpha-dichloropropionic acid and beta,beta-dichloropropionic acid.

The dehydrohalogenation-esterification of the starting materials may be carried out in any suitable pyrolitic reaction chamber which will afford proper mixing of the starting materials and proper control of the temperature. The chamber or reaction column may be made of any suitable material, as for example glass, nickel alloy, steel, or other non-corrosive material. The starting materials are briefly introduced into the reaction chamber in the form of vapors which may then be carried through the heated zone by means of an inert gas, as for example carbon dioxide, nitrogen, or by means of a vacuum at the exit end of the reaction chamber or by means of pressure at the entrance end of the chamber or by means of gravity flow.

It has been discovered that the vapors of the starting material must be heated at a temperature between about 450° C. and about 550° C. for a contact time not less than about 0.05 second and not more than about 5 seconds in order to bring about the desired dehydrohalogenation and esterification of the starting materials to produce the beta form of methyl-chloroacrylate. It is preferred to heat the starting materials of this invention at a temperature between about 475° C. and about 500° C. for a contact time of between about 0.5 second and about 1.0 second using as the starting acid the alpha, beta-dichloropropionic acid.

The pyrolyzate obtained in accordance with the method of this invention contains as its predominant ingredient the beta form of methyl-chloroacrylate.

Concentration of the desirable acrylate may be carried out by fractional distillation under a pressure of 150 mm. of mercury, withdrawing that fraction boiling at a temperature between about 86° C. and about 90° C. This fraction is substantially free of other reaction products.

A typical example showing the method of producing the beta-chloroacrylate of this invention is as follows:

*Example*

Eighty-one (81) parts of alpha, beta-dichloropropionic acid and 55 parts of methanol were passed into a reaction zone made from a ⅞ inch glass tube packed with Berl saddles and placed in a vertical position. A two-foot section of this column was provided with an electrical heating coil and maintained at a temperature between about 475° C. and about 500° C. The starting materials were introduced into the top portion of the column and were permitted to flow by gravity towards the heated section. The exit gas was drawn off at the lower end of the column at such a rate that it took 81 minutes for the starting materials to pass through the reaction zone. The resulting pyrolyzate was passed through a condensing system and then fractionated under a pressure of 150 mm. of mercury and the fraction boiling at a temperature between about 86° C. and about 90° C. was collected. An analysis of this fraction showed a density of 1.160 at 24° C./15° C. and a refractive index of 1.4310 at 20° C./D. This analysis indicated that the fraction was substantially pure methyl-beta-chloroacrylate.

It has been found that the new composition of this invention is very useful in carrying out polymerization reactions either as a polymer or as a copolymer with other polymerizable monomers to produce interesting materials that have characteristics ranging from a soft plastic through a rubber-like plastic to a hard plastic, the characteristics depending upon the conditions of polymerization and the monomers used.

This application is a continuation-in-part of my copending application Serial No. 449,185 filed June 30, 1942.

Although the present invention has been described and claimed with reference to the specific details of said components thereof it is not intended that such details shall be regarded as limitations upon the scope of the invention except insofar as included in the accompanying claims.

I claim:

1. The method of producing methyl-beta-chloroacrylate which comprises heating a dichloropropionic acid and methanol at a temperature between about 450° C. and about 500° C. at a contact time between about 0.05 second and about 5 seconds.

2. The method of producing methyl-beta-chloroacrylate which comprises heating alpha, beta-dichloropropionic acid and methanol at a temperature between about 475° C. and about 500° C. for a contact time of between about 0.5 second and about 1.0 second.

JOY G. LICHTY.